(12) United States Patent
Huang-Fu

(10) Patent No.: US 11,343,699 B2
(45) Date of Patent: May 24, 2022

(54) EPS BEARER CONTEXT STATUS SYNCHRONIZATION UPON INTER-SYSTEM CHANGE FROM EVOLVED PACKET SYSTEM (EPS) TO FIFTH GENERATION SYSTEM (5GS)

(71) Applicant: MEDIATEK INC., Hsinchu (TW)

(72) Inventor: Chien-Chun Huang-Fu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/837,040

(22) Filed: Apr. 1, 2020

(65) Prior Publication Data

US 2020/0329397 A1 Oct. 15, 2020

Related U.S. Application Data

(60) Provisional application No. 62/831,219, filed on Apr. 9, 2019.

(51) Int. Cl.
*H04W 28/02* (2009.01)
*H04W 80/10* (2009.01)
*H04W 60/00* (2009.01)

(52) U.S. Cl.
CPC ... *H04W 28/0257* (2013.01); *H04W 28/0268* (2013.01); *H04W 60/00* (2013.01); *H04W 80/10* (2013.01)

(58) Field of Classification Search
CPC ......... H04W 28/0257; H04W 28/0268; H04W 60/00; H04W 80/10
See application file for complete search history.

(56) References Cited

U.S. PATENT DOCUMENTS

| 10,638,537 | B2 | 4/2020 | Jangid et al. |
| 2016/0338144 | A1 | 11/2016 | Jangid et al. |
| 2018/0234903 | A1 | 8/2018 | Jheng et al. |
| 2020/0336948 | A1* | 10/2020 | Kawasaki ............... H04W 8/06 |

FOREIGN PATENT DOCUMENTS

| CN | 108632917 A | 10/2018 |
| WO | WO 2019/029883 A1 | 2/2019 |

OTHER PUBLICATIONS

Huawei, et at, "Discussion on EPS bearer synchronization when UE move from EPC to 5GC", S2-1901861, SA WG2 Meeting #131, Feb. 25, 2019-Mar. 1, 2019. (Year: 2019).*

(Continued)

*Primary Examiner* — Khoa Huynh
(74) *Attorney, Agent, or Firm* — Oblon, McClelland, Maier & Neustadt, L.L.P.

(57) ABSTRACT

A method for synchronizing evolved packet system (EPS) bearer context status between a user equipment (UE) and a network can include locally deactivating an EPS bearer context of a packet data network (PDN) connection at the UE while the UE operates in S1 mode without notifying the network serving the UE, wherein interworking to a fifth generation system (5GS) is supported for the deactivated EPS bearer context, and upon inter-system change from S1 mode to N1 mode, including an EPS bearer context status information element (IE) in a registration request message indicating which EPS bearer contexts are active in the UE before the inter-system change.

14 Claims, 4 Drawing Sheets

(56) References Cited

OTHER PUBLICATIONS

International Search Report and Written Opinion dated Jul. 1, 2020 in PCT/CN2020/083901, 9 pages.
Huawei, et al., "Discussion on EPS bearer synchronization when UE move from EPC to 5GC," SA WG2 Meeting #131 S2-1901861, 2019, 3 pages.
Combined Taiwanese Office Action and Search Report dated Nov. 19, 2020 in Patent Application No. 109111759, 8 pages, Translation included with Remarks dated Jun. 30, 2021.
"5G; Non-Access-Stratum (NAS) protocol for 5G System (5GS); Stage 3 (3GPP TS 24.501 version 15.1.0 Release 15)" ETSI TS 124 501 V15.1.0, Oct. 2018, 406 pages.

* cited by examiner

EPS BEARER CONTEXT STATUS SYNCHRONIZATION UPON INTER-SYSTEM CHANGE FROM EVOLVED PACKET SYSTEM (EPS) TO FIFTH GENERATION SYSTEM (5GS)

INCORPORATION BY REFERENCE

This present application claims the benefit of U.S. Provisional Application No. 62/831,219, "Enhancement of EPS Bearer Synchronization" filed on Apr. 9, 2019, which is incorporated herein by reference in its entirety.

TECHNICAL FIELD

The present disclosure relates to wireless communications, and specifically relates to interworking between fifth generation system (5GS) and evolved packet system (EPS).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Geographical coverage of 5G New Radio (NR) access network connected to a 5G core (5GC) network is limited when 5G system (5GS) is newly introduced. A mobile device moves out of a coverage of the NR access network served by the 5GC network can rely on another radio access technology (e.g., evolved universal terrestrial radio access (E-UTRA)) connected to an evolved packet core (EPC) network in an evolved packet system (EPS). Interworking between the 5GC and the EPC enables a mobile device user to have wide-area mobility while retaining a stable IP address.

SUMMARY

Aspects of the disclosure provide a method for synchronizing evolved packet system (EPS) bearer context status between a user equipment (UE) and a network. The method can include locally deactivating an EPS bearer context of a packet data network (PDN) connection at the UE while the UE operates in S1 mode without notifying the network serving the UE, wherein interworking to a fifth generation system (5GS) is supported for the deactivated EPS bearer context, and upon inter-system change from S1 mode to N1 mode, including an EPS bearer context status information element (IE) in a registration request message indicating which EPS bearer contexts are active in the UE before the inter-system change.

An embodiment of the method includes deactivating the EPS bearer context for which an EPS serving the UE operating in S1 mode indicates that the interworking to the 5GS is supported. Another embodiment of the method includes deactivating the EPS bearer context having an association between the EPS bearer context and a quality of service (QoS) flow stored during an inter-system change from the 5GS. In an embodiment, the EPS bearer context is allocated 5G QoS parameters by an EPS serving the UE operating in S1 mode. In an embodiment, the EPS bearer context is associated with 5G QoS parameters used in a protocol data unit (PDU) session transferred to the PDN connection during an inter-system change from the 5GS.

In an example, the UE operates in a single-registration mode. In an embodiment, the method further includes transmitting the registration request message to a fifth generation core (5GC) serving the UE after the inter-system change from S1 mode to N1 mode.

Aspects of the disclosure provide a UE. The UE includes circuitry configured to locally deactivate an EPS bearer context of a PDN connection while the UE operates in S1 mode without notifying a network serving the UE. Interworking to a 5GS is supported for the deactivated EPS bearer context. The circuitry is further configured to, upon inter-system change of the UE from S1 mode to N1 mode, include an EPS bearer context status IE in a registration request message indicating which EPS bearer contexts are active in the UE before the inter-system change.

Aspects of the disclosure provide a non-transitory computer-readable medium storing instructions that, when executed by a processor, cause the processor to perform the method for synchronizing EPS bearer context status between a UE and a network.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
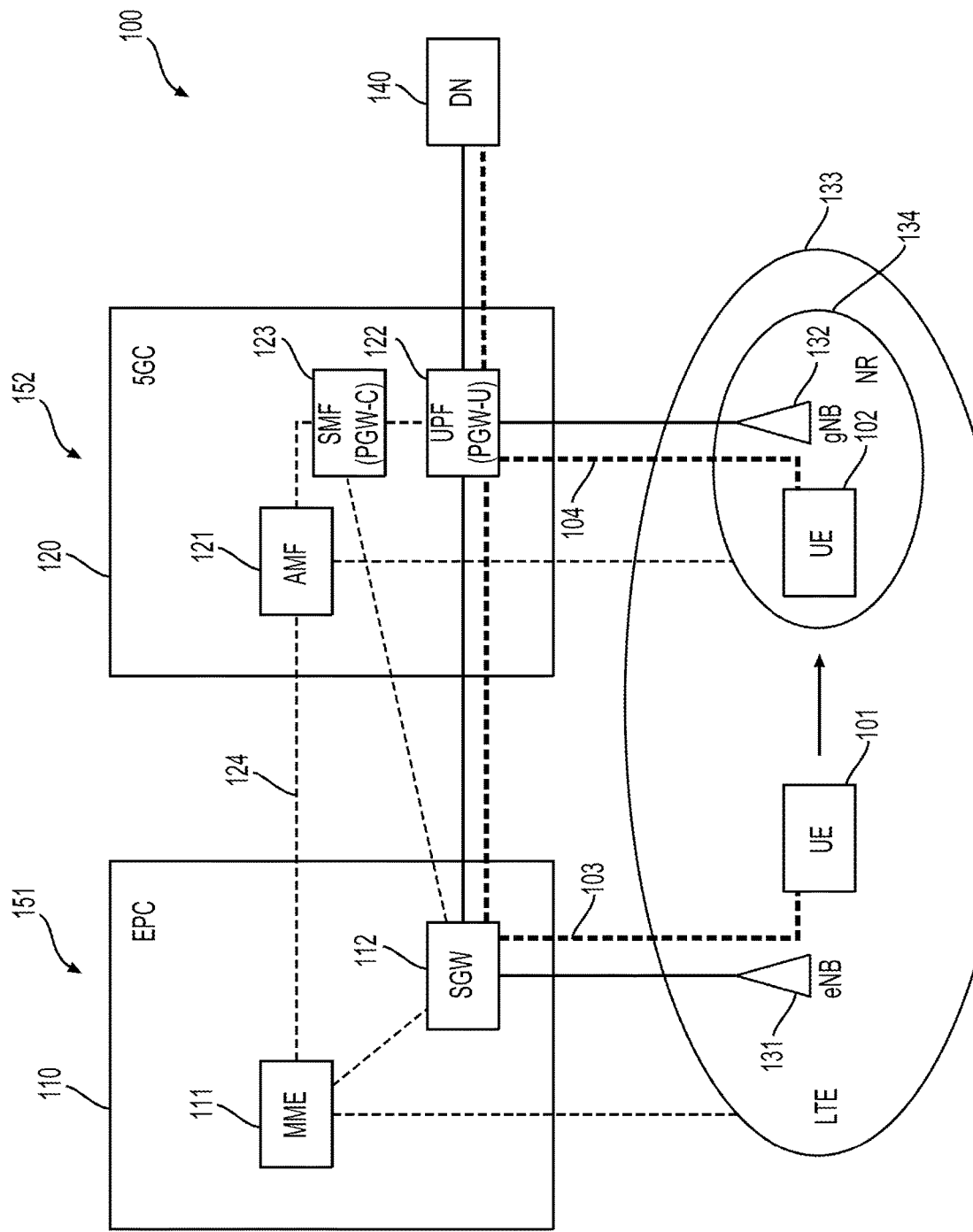
FIG. 1 shows a wireless communication system 100 according to an embodiment of the disclosure.

FIG. 1 shows a wireless communication system 100 according to an embodiment of the disclosure. The system 100 includes an evolved packet core (EPC) 110 and a fifth generation core (5GC) 120 that interwork with each other. The EPC 110 is connected to a first base station 131 implementing Long Term Evolution (LTE) radio access technology. For example, the first base station 131 can be an eNB 131 implementing the evolved universal terrestrial radio access (E-UTRA) air interface as specified in the 3rd Generation Partnership Project (3GPP) LTE standards. The 5GC 120 is connected to a second based station 132 implementing fifth generation (5G) New Radio (NR) access technology or other non-3GPP access technology. For example, the second base station 132 can be a gNB 132 implementing the NR air interface as specified in the 3GPP NR standards. The eNB 131 can have a coverage 133 overlapping a coverage 134 of the gNB 132. The EPC 110 and the eNB 131 form an evolved packet system (EPS) 151 while the 5GC 120 and the gNB 132 form a 5G system (5GS) 152.

The EPC 110 can include a mobility management entity (MME) 111, and a serving gateway (SGW) 112. The MME 111 can be configured to perform bearer activation/deactivation operations, and terminate non-access stratum (NAS) signaling from a user equipment (UE) served by the eNB 131. The SGW 112 can be configured to route and forward user data packets to and from UEs served by the eNB 131. In coordination with the MME 111, the SGW 112 can serve as a mobility anchor for user plane during inter-eNB handovers.

The 5GC 120 can include an access and mobility management function (AMF) 121, a user plane function (UPF) 122, and a session management function (SMF) 123. The AMF 121 communicates with UEs served by the gNB 132 using 5GC NAS protocol. For example, different from the MME 111, the AMF 121 does not handle session management. Instead, the AMF 121 forwards session management related signaling messages between UEs served by the gNB 132 and the SMF 123. In addition, the AMF 121 can exchange UE contexts (e.g., session contexts) with the MME 111 via an interface 124 (e.g., N26 interface specified in 3GPP standards).

The SMF 123 is configured to manage UE sessions passing through the UPF 122. For example, the SMF 123 can be configured to perform functions of establishment, modification, and release of individual sessions, and allocation of IP addresses per session. The sessions managed by the SMF 123 can be sessions between the UPF 122 and UEs served by the gNB 132, or can be sessions between the UPF 122 and UEs served by the eNB 131 via the SGW 112. For example, the SMF 123 and the UPF 122 can implement packet data network (PDN) gateway (PGW) control plane function (PGW-C) and PGW user plane function (PGW-U), respectively, to enable sessions being established between the SGW 112 and the UPF 122.

The UPF 122 is configured to process and forward user data under the control of the SMF 123. For example, the UPF 122 can serve as an anchor point for connecting UEs served by the system 100 towards an external data network (DN) 140 (e.g., the Internet). IP packets with an IP address belonging to a specific UE served by the UPF 122 can be routable from the DN 140 to the UPF 122 while the specific UE is moving around within coverage of the system 100.

In an example, a UE 101 out of the coverage 134 but within the coverage 133 is served by the EPC 110. The UE 101 can be a mobile phone, a laptop, a vehicle, and the like. The UE 101 is capable of operating in EPC NAS mode or 5GC NAS mode. At current location shown in FIG. 1, the UE 101 can be served by the EPC 110, and operate in EPC NAS mode. For example, data can be transmitted between the UE 101 and the SGW 112 via an S1-U interface, while NAS messages for control signaling can be transmitted between the UE 101 and the MME 111 via an S1-MME interface. Thus, the EPC NAS mode is also referred to as S1 mode. A session 103 (referred to as a PDN connection 103, or EPS session 103) can be established between the UE 101 and the UPF 122 via the SGW 112.

As shown, the UE 101 can move from the eNB 131 to the gNB 132, and enters the coverage 134 of the gNB 132. The UE 101 at the new location within the coverage 134 is shown as UE 102. During the moving, if the UE 101 operates in radio resource control (RRC) connected mode, the UE 101 can perform a handover procedure to switch from the EPS 151 to the 5GS 152. During the handover procedure, the PDN connection 103 of UE 101 can be switched (relocated or transferred) to a new session 104 (referred to as a protocol data unit (PDU) session 104) established between the UE 102 and the UPF 122. As the UPF 122 serves as an anchor point connecting the DN 140, the PDN connection 103 can be maintained while being switched to the PDU session 104 without changing an IP address assigned for the UE 101 (or 102).

During the moving, if the UE 101 operates in RRC idle mode, the UE 101 can perform a cell reselection process to switch from the EPS 151 to the 5GS 152. During the switching from the EPS 151 to the 5GS 152, the UE 101 can deactivate the PDN connection 103 and set up the PDU session 104.

The UE 102 is served by the 5GC 120, and operates in 5GC NAS mode. For example, data can be transmitted between the UE 102 and the UPF 122, while NAS messages for control signaling can be transmitted between the UE 102 and the AMF 121 via an N1 interface. Thus, the 5GC NAS mode is also referred to as N1 mode.

In FIG. 1 example, the UE 101 (or 102) can operate in a single-registration mode. When in the single-registration mode, the UE 101 can operate either in S1 mode or N1 mode. The EPC 110 and the 5GC 120 can interwork with each other based on the N26 interface 126 to support mobility of the UE 101 between the EPS 151 and the 5GS 152 (e.g., enabling seamless session continuity for inter-system change). Interworking procedures using the N26 interface enables the exchange of mobile management (MM) states and session management (SM) states between the source and the target network.

In an example, when the UE 102 moves from the 5GS 152 to the EPS 151, the SMF 123 determines which PDU Sessions can be relocated to the target EPS 151, e.g. based on capability of the deployed EPS 151, operator policies for which PDU session seamless session continuity should be supported, etc. The SMF 132 can release the PDU Sessions that cannot be transferred as part of the handover or idle mode mobility. Whether the PDU Session is successfully moved to the target network can be determined by the target EPS 151. In an example, when the UE 101 moves from the EPS 151 to the 5GS 152, the MME 111 can select the SMF 123 (PGW-C+SMF) for PDN connections. The SMF 123 (PGW-C+SMF) determines which PDN connections can be relocated to the target 5GS 152, e.g. based on capability of the deployed 5GS 152, subscription and operator policies for which PDN Connection seamless session continuity should be supported, etc. The SMF 123 (PGW-C+SMF) and NG-RAN (e.g., the gNB 132) can reject the PDN Connections that cannot be transferred as part of the handover or idle mode mobility.

In an example, for idle mode mobility from the 5GS 152 to the EPS 151, the UE 102 performs either a tacking area updating (TAU) or an attach procedure to indicate that the UE 102 is moving from the 5GC 120. The MME 111 can retrieve the UE 102's MM and SM context from 5GC 120. For connected mode mobility from the 5GS 152 to the EPS 151, an inter-system handover can be performed. At the inter-system handover, the AMF 121 selects the target MME 111.

In an example, for idle mode mobility from the EPC 110 to the 5GC 120, the UE 101 can perform a mobility registration procedure with the AMF 121. The AMF 121 and the SMF 123 can retrieve the UE 101's MM and SM context from the EPC 110. For connected mode mobility from the EPC 110 to the 5GC 120, an inter-system handover can be performed. At the inter-system handover, the MME 111 selects the target AMF 121 for related operations.

In an example, when the UE 102 is served by the 5GC 120, during PDU session establishment and guaranteed bit rate (GBR) QoS Flow establishment, the SMF 123 (PGW-C+SMF) performs EPS QoS mappings, from the 5G QoS parameters obtained from a policy control function (PCF), and allocates traffic flow templates (TFT) (corresponding to EPS bearer contexts) with the policy and charging control (PCC) rules obtained from the PCF if PCC is deployed. Otherwise, EPS QoS mappings and TFT allocation are mapped by the SMF 123 (PGW-C+SMF) locally. The SMF 123 (PGW+SMF) can ignore 5G QoS parameters that are not applicable to the EPC 110 (e.g. QoS notification control). In addition, EPS Bearer IDs (EBIs) are allocated by the serving AMF 121 requested by the SMF 123 if the SMF 123 determines that EBIs need to be assigned to the QoS Flows. For each PDU session, EBIs are allocated to the default EPS bearer and dedicated bearers. The SMF 123 can determine the QoS flows that require EBIs based on a QoS profile and operator policies.

For example, based on the operator policies, the SMF 123 can map all non-GBR QoS flows to default EPS bearer. In such a case, one EBI for all the non-GBR QoS flows is assigned. Alternatively, the SMF 123 can map one non-GBR QoS flow to one dedicated EPS bearer. In such case, a dedicated EBI can be assigned for the non-GBR QoS flow that is mapped to the dedicated EPS bearer. In between the above two extreme cases, the SMF 123 can map more than one (but not all) non-GBR QoS Flow to a same EPS bearer (either default EPS bearer or dedicated EPS bearer). When a new QoS Flow needs to be mapped to an EPS Bearer ID that has already been assigned for an existing QoS Flow, the SMF 123 can include the already assigned EBI in the QoS Flow description sent to the UE 102.

In an example, when the UE 101 is served by the EPC 110, during PDN connection establishment, the UE 101 allocates a PDU session ID and sends the PDU session ID to the SMF 123 (PGW-C+SMF) via protocol configuration options (PCO). During the PDN connection establishment and dedicated bearer establishment, the SMF 123 (PGW-C+SMF) performs EPS QoS mappings from the 5G QoS parameters obtained from the PCF, and allocates TFT with PCC rules obtained from the PCF if PCC is deployed. Otherwise, EPS QoS mappings and TFT allocation are mapped by the SMF 123 (PGW-C+SMF) locally. Other 5G QoS parameters corresponding to the PDN connection, e.g. session aggregated maximum bit rate (AMBR), and QoS rules and QoS flow level QoS parameters (e.g., QoS parameters in a QoS flow description) if needed for the QoS flow(s) associated with the QoS rule(s) are sent to the UE 101 in PCO.

The UE 101 and the SMF 123 (PGW-C+SMF) can store the association between an EPS context and a PDU session context to use in case of handover from the EPS 110 to the 5GS 120. During EPS bearer establishment/modification procedures, QoS rules corresponding to the related EPS bearers (or EPS bearer contexts) are allocated and sent to the UE 101 in PCO. The 5G QoS parameters (QoS rules and QoS descriptions) are stored in the UE 101 and are to be used, for example, when the UE 101 is handed over from the EPS 110 to the 5GS 120. The 5G QoS parameters may be provided to the SMF 123 (PGW-C+SMF) by the PCF, if PCC is deployed. On mobility from the 151 EPS to the 5GS 152, the UE 101 and the SMF 123 (PGW-C+SMF) store the association between the EPS bearers (EPS bearer contexts) and the corresponding 5G QoS Rules and QoS Flow level QoS parameters if needed for the QoS Flow(s) associated with the QoS rule(s). When the EPS bearer is deleted e.g. due to EPS bearer status synchronization or bearer deactivation, the UE 101 and the SMF 123 (PGW-C+SMF) can delete any possibly existing 5G QoS Rule(s) and QoS Flow level QoS parameters if any for the QoS Flow(s) associated with the QoS rule(s) associated with the deleted EPS bearer.

In an embodiment, the UE 101 operating in single-registration mode performs an inter-system change from S1 mode to N1 mode. Before the inter-system change, while operating in S1 mode and being served by the EPS 151, the UE 101 can locally deactivate one or more EPS bearer contexts (for which interworking to the 5GS 152 is supported) without notifying the network (the EPC 110 or the 5GC 120). Accordingly, upon the intersystem change from the EPS 151 to the 5GS 152, the UE 102 can include an EPS bearer context status information element (IE) in a registration request message, and transmits the registration message to the 5GC 120 to indicate which EPS bearer contexts are previously active in the UE 101 before the inter-system change. In this way, EPS bearer context status can be synchronized between the UE 102 and the network of the EPC 110 and the 5GC 120.

In an example, interworking (transferring) to the 5GS 152 is supported for a PDN connection if a default EPS bearer context corresponding to the PDN connection is allowed to be transferred to the 5GS 152. The corresponding default EPS bearer is supported for inter-working to the 5GS 152 if the corresponding default EPS bearer context (1) includes 5G QoS parameters received from the EPC 110, or (2) has an association with 5G QoS parameters after an inter-system change from N1 mode to S1 mode (in other words, has an association with one or more QoS flows defined by the corresponding 5G QoS parameters). The 5G QoS parameters can include a PDU session identity, session AMBR, one or more QoS flow descriptions, or the like. In scenario (1), the 5G QoS parameters can be received in a PCO IE or extended PCO (EPCO) IE from, for example, the EPC 110 (originated from the SMF 123 (PGW-C+SMF)). In scenario (2), the 5G QoS parameters are associated with the default EPS bearer context while the UE 102 operates in N1 mode, and the association between the default EPS bearer context and the 5G QoS parameters are stored at the UE 101 when the UE 102 performs the inter-system change from the 5GC 120 to the EPC 110.

For other dedicated EPS bearer contexts in the PDN connection for which inter-system change to 5GS 152 is supported, if the dedicated EPS bearer context (1) includes 5G QoS parameters received from the EPC 110 via a PCO IE or EPCO IE, or (2) has an association with 5G QoS parameters after the inter-system change from the 5GS 152, the dedicated EPS bearer is supported for interworking (transferring) to the 5GS 152, or, in other words, interworking to the 5GS 152 is supported for the dedicated EPS bearer.

Before the inter-system change, while operating in S1 mode and being served by the EPS 151, the UE 101 can locally deactivate one or more EPS bearer contexts without notifying the EPC 110 or the 5GC 120. For example, while operating in idle mode, the UE 101 may deactivate an EPS bearer context, for example, when an upper layer application indicates a packet flow corresponding to the EPS bearer context is terminated. For another example, for a UE in NB-S1 mode, a dedicated EPS bearer contexts activation procedure is not used. Upon an inter-system mobility from WB-S1 mode to NB-S1 mode in EMM-IDLE mode, if the UE has at least one dedicated EPS bearer context in ESM state "bearer context active", the UE can locally deactivate any such dedicated EPS bearer context. For a further example, in a UE requested PDN connection disconnect procedure, upon the fifth expiry of the timer T3492, the UE 101 can abort the procedure, and deactivate all EPS bearer contexts for this PDN connection locally without peer-to-peer signaling between the UE 101 and the MME 111. For another example, in a UE requested bearer resource modification procedure, on the fifth expiry of timer T3481, the UE 101 can abort the procedure. If the UE 101 have initiated resource release for all the traffic flows for the bearer, the UE 101 can deactivate the EPS bearer context locally without peer-to-peer signaling between the UE 101 and the MME 111.

Typically, when the above scenarios of deactivating an EPS bearer context without notifying the network takes place, the UE 101 or another UE can inform the network (the EPC 110 or the 5GC 120) the deactivated EPS bearer context at a next tracking area updating (TAU) opportunity, or a next service request (SR) opportunity. When the inter-system change takes place before the TAU or SR opportunity is available, the UE 101 will have no chance to notify the network.

When the UE 101 has locally deactivated one or more EPS bearer contexts (either default or dedicated) for which EPS interworking to the 5GS 152 is supported while the UE 101 is in S1 mode without notifying the network (the EPC 110 or the 5GC 120), EPS bearer context status at the UE 101 and at the network would be unsynchronized. For example, as described, the SMF 123 (PGW-C+SMF) can perform EPS QoS mapping when a QoS flow is created in the 5GS 152 or an EPS bearer context is created in the EPS 151 to establish an association between EPS bearer contexts and 5G QoS parameters (QoS rules, QoS flow descriptions, and the like). The associations can be stored at the SMF 123. When the UE 101 locally deactivate an EPS bearer context without notifying the network, records of EPS bear contexts at the network can be different from the EPS bearer context status at the UE 101.

Accordingly, taking advantage of the opportunity of registration update upon inter-system change from S1 mode to N1 mode, the UE 102 can update the local EPS bearer context status to the network to make the EPS bearer context status at the UE 102 and the network synchronized. For example, in the connected mode inter-system change process, a mobility and periodic registration update procedure can be performed after the handover operation. In the idle mode inter-system change process, a mobility and periodic registration update procedure can be performed after a cell selection operation. In the mobility and periodic registration procedure, an EPS bearer context status IE can be included in a registration request message that is transmitted from the UE 102 to the AMF 121. The EPS bearer context status IE can indicate which ESP bearer contexts are active or inactive before the inter-system change. In this way, synchronization of EPS bearer context status between the UE 102 and the network can be obtained.

Figure 2:
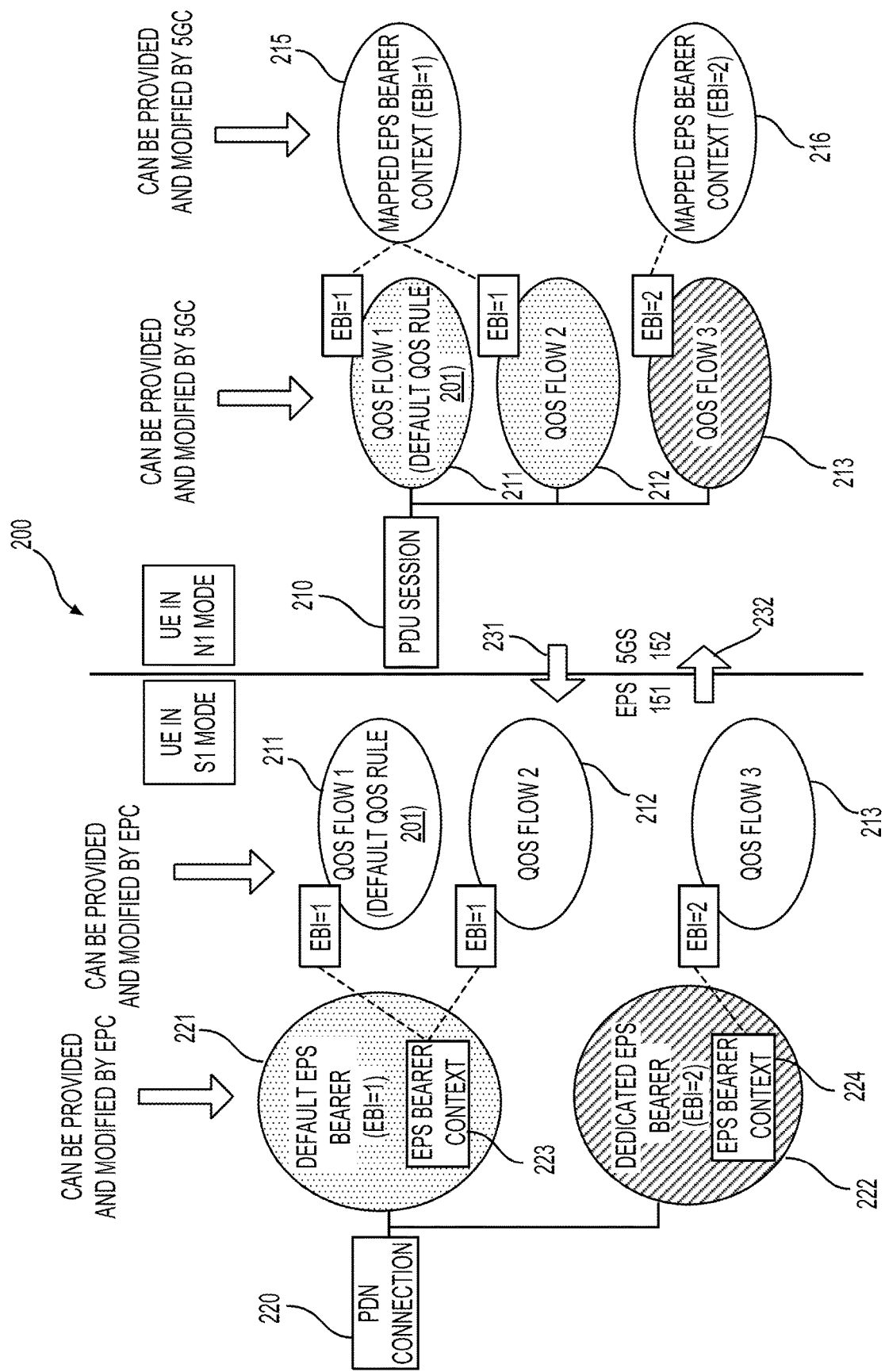
FIG. 2 shows an example of a mapping relationship 200 between a protocol data unit (PDU) session 210 in the fifth generation system (5GS) 152 and a packet data network (PDN) connection 220 in the evolved packet system (EPS) 151 when inter-system changes between N1 mode and S1 mode take place.

FIG. 2 shows an example of a mapping relationship 200 between a PDU session 210 in the 5GS 152 and a PDN connection 220 in the EPS 151 when inter-system changes between N1 mode and S1 mode take place. The UE 101 (or 102) and the system 100 is used as examples for explanation of FIG. 2. As described with reference to FIG. 1, the UE 101 (or 102) operates in a single registration mode and is capable of operation in S1 mode and N1 mode. Also, the EPC 110 and the 5GC 120 allow the UE 101 (or 102) to be served within the serving areas of the EPC 110 and the 5GC 120, respectively.

The PDU session 210 can be established and maintained between the UE 102 and the UPF 122 in FIG. 1. The PDU session 210 includes three QoS flows 211-213. Each QoS flow 211-213 can be characterized by one or more QoS rules. Each QoS rule includes traffic filters associating PDUs to the respective QoS flow. The QoS flow 211 can be associated with a default QoS rule 201 that includes a traffic filter set allowing all uplink packets to pass through. The default QoS rule 201 can be used in case there is no other QoS rule with a packet filter set matching the uplink data packets. The QoS flow 211 is associated with the default QoS rule, and thus is referred to as a default QoS flow, while the QoS flows 212-213 are not associated with a default QoS rule, and thus are referred to as non-default QoS flows.

Each QoS flow 211-213 can further be associated with and characterized by a QoS flow description including QoS related parameters corresponding to the respective QoS flow. In addition, the QoS flow description can include an EPS bearer identity (EBI) for use in inter-system change of the UE 102 from N1 mode to S1 mode. As shown, the QoS flows 211-213 can be associated with EBIs having values of 1, 1, and 2, respectively. Each EBI can be used as an index to associate the respective QoS flow 211-213 to a mapped EPS bearer context 215 or 216.

For example, the default QoS flow 211 and the non-default QoS flow 212 both have a EBI=1, and accordingly are associated to the mapped EPS bearer context 215 having an EBI=1. Similarly, the non-default QoS flow 213 having EBI=2 is associated to the mapped EPS bearer context 216 having EBI=2.

The mapped EPS bearer contexts 215-216 each provide information of an EPS bearer that would be mapped with the corresponding QoS flow(s) when an inter-system change from N1 mode to S1 mode takes place. For example, in addition to the EBI=1, the mapped EPS bearer context 215 can include TFTs and QoS parameters characterizing the respective EPS bearer (EBI=1) to be mapped to the QoS flows 211-212. Similarly, the mapped EPS bearer context 216 can include TFTs and QoS parameters characterizing the respective EPS bearer (EBI=2) to be mapped to the QoS flows 213.

The QoS flows 211-213 can be provided (established) by the 5GC 120. For example, parameters characterizing the QoS flows 211-213 can be provided to the UE 102 while the PDU session 210 is created. During the establishment of the PDU session 210 or the QoS flows 211-213, the mapped EPS bearer contexts 215-216 can also be provided from the 5GC 120, for example, through NAS signaling.

Alternatively, the QoS flows 211-213 and the respective mapped EPS bearer contexts 215-216 can be established at the UE 102 upon inter-system change of the UE 101 from S1 mode to N1 mode. For example, the EPS bearers of EBI=1 and EBI=2 can previously exit when the UE 101 is in S1 mode. Upon the inter-system change from S1 mode to N1 mode, the previous EPS bearers can be mapped to the QoS flows 211-213. Parameters of the previous EPS bearers of EBI=1 and EBI=2 (e.g., TFTs, and associated QoS parameters) can be stored at the UE 102. An association between each of the QoS flows 211-213 and the respective previous EPS bearer can be stored. Thus, instead of using the mapped EPS bearer contexts 215 and 216, the stored associations between the QoS flows and the mapped EPS bearers can be used to fetch information similar to that in the mapped EPS bear contexts 215-216.

Accordingly, in this detailed description, mapped EPS bearer contexts, or parameters or information in the mapped EPS bearer contexts may also be used to refer to parameters or information obtained from the associations between QoS flows and mapped EPS bearers when describing session switches during inter-system changes between N1 mode and S1 mode.

While the PDU session 210 being maintained before an inter-system change from N1 mode to S1 mode takes place, the PDU session 210 may be modified (either initiated by the UE 102 or the 5GC 120). For example, new QoS flows may be added, or existing QoS flows may be removed or modified (e.g., QoS rules of an existing QoS flow may be changed, or removed, or a new QoS rule may be added; a QoS flow description of an existing QoS flow may be removed, replaced, or modified). Under such scenarios, the mapped EPS bear contexts 215-216 can also be modified to adapt the to-be-mapped EPS bearers to match the status of the modified PDU session 210. For example, through NAS signaling, new mapped EPS bearer context may be provided, and existing mapped EPS bearer context may be modified or removed.

The left side of the FIG. 2 shows the PDN connection 220 in the EPS 151. The PDN connection 220 can be established and maintained between the UE 101 and the UPF 122 (PGW-U+UPF) via the SGW 112 in FIG. 1. The PDN connection 220 can include a default EPS bearer 221 with EBI=1 and a dedicated EPS bearer 222 with EBI=2. Each EPS bearer 221-222 can be characterized by one or more TFTs and a set of QoS parameters. The default EPS bearer 221 can be the first EPS bearer activated when the PDN connection 220 is created, and can stay activated until the PDN connection 220 is terminated even no data is transmitted. The default bearer 221 can typically be set as a non-guaranteed bit rate (non-GBR) type. In contrast, the dedicated EPS bearer 222 can typically be an additional EPS bearer activated on demand after the PDN connection 220 is established. The dedicated EPS bearer 222 can be of a GBR or non-GBR type.

In addition, the default EPS bearer 221 can include none of TFTs, and packets not filtered into the dedicated EPS bearer 222 (or other dedicated EPS bearer, if activated) may be carried in the default bearer 221. In contrast, the dedicated EPS bearer 222 typically includes at least one TFT providing filters for filtering packets that may need QoS treatment different from that of the default EPS bearer 221.

The default EPS bearer 221 of EBI=1 can be associated with an EPS bearer context 223. The EPS bearer context 223 may include QoS related parameters (e.g., QoS parameters, TFTs, or the like) associated with the default EPS bearer 221, and/or parameters associated with the PDN connection 220. As an EPS bearer is a logical session defined by QoS parameters included in an associated EPS bearer context at the UE 101, "an EPS bearer context" can be used to refer to "an EPS bearer" in this detailed description, and in some places, the "EPS bearer" and "EPS bearer context" are used interchangeably.

In addition, the EPS bearer context 223 may be associated with parameters or information of QoS flows which the default EPS bearer 221 would be mapped to when inter-system change from S1 mode to N1 mode takes place. In another example, parameters or information of QoS flows which the default EPS bearer 221 would be mapped to can be included in the EPS bearer context 223 (i.e., the QoS flow description).

For example, as shown in FIG. 2, the default EPS bearer 221 is to be mapped to the QoS flows 211-212 in case an inter-system change of the UE 101 from S1 mode to N1 mode takes place. Corresponding to this configuration, the EPS bearer context 223 can be associated with QoS flow descriptions and/or QoS rules defining the QoS follows 211 and 212.

The dedicated EPS bearer 222 of EBI=2 can be associated with an EPS bearer context 224. The dedicated EPS bearer 222 is to be mapped to the QoS flow 213. Accordingly, corresponding to this configuration, the EPS bearer context 224 can be associated with the QoS flow description and QoS rules corresponding to the QoS follow 213.

The default EPS bearer 221 and the dedicated EPS bearer 222 can be provided by the EPC 110. For example, parameters characterizing the EPS bearer 221 can be provided to the UE 101 when the PDN connection 220 is created, and parameters characterizing EPS bearer 222 can subsequently be added. For example, during the establishment of the PDN connection 220, the EPS bearer contexts 223-224 can be provided from the EPC 110, for example, through NAS signaling.

Alternatively, the EPS bearers 221-222 and the respective associated EPS bearer contexts 223-224 can be established at the UE 101 upon inter-system change of the UE 101 from N1 mode to S1 mode. For example, the QoS flows 211-213 exist previously when the UE 102 is in N1 mode. Upon inter-system change from N1 mode to S1 mode, the previous QoS flows 211-213 can be mapped to the EPS bears 221-222 based on the indication of the mapped EPS bearer contexts 215-216. Parameters of the previous QoS flows 211-213 (e.g., QoS rules and QoS flow descriptions) can be stored at the UE 101. For example, the parameters of the previous QoS flows 211-212 can be associated with the EPS bearer context 223, while the parameters of the previous QoS flow 213 can be associated with the EPS bearer context 224.

Similarly, while the PDN connection 220 being maintained before an inter-system change from S1 mode to N1 mode takes place, the PDN connection 220 can be modified. For example, new EPS bearers can be created, or existing EPS bearers can be modified or removed. Accordingly, the corresponding QoS flow descriptions/QoS rules parameters associated with the EPS bearer context 223-224 can also be modified to adjust the to-be-mapped QoS flows to match the updated status of the modified PDN connection 220.

For example, through NAS signaling, the UE 101 can receive new QoS rule(s) and/or QoS flow description(s) or indications of how to modify existing QoS rules and/or QoS flow descriptions carried in NAS messages. For example, a protocol configuration options (PCO) IE or an extended PCO IE can be received in a modify EPS bearer context request message. For example, the PCO IE or the extended PCO IE can carry one or more QoS rule parameters. Each QoS rule parameter can indicate how to create a new QoS rule or modifying (including deleting and changing) an existing QoS rule. Or, the PCO IE or the extended PCO IE can carry one or more QoS flow description parameters. Each QoS flow description parameter can indicate how to create or modify a QoS flow description. Each QoS flow description parameter can indicate an EBI that associates the respective QoS flow description (and respective QoS rules) to the target EPS bearer context. Based on the IE in the NAS message for creating or modifying respective QoS rules or QoS flow descriptions, the QoS rule(s) and QoS flow(s) associated with the EPS bearer contexts 223-224 can be modified, or replaced.

As examples, two processes 231 and 232 of session switches between the PDU session 210 and the PDN connection 220 are described below.

Upon inter-system change of the UE 102 from N1 mode to S1 mode takes place, the first session switch process 231 can be performed to switch the PDU session 210 in the 5GS 152 to the PDN connection 220 in the EPS 151. The UE 102 can create the default EPS bearer context 223, and the dedicated EPS bearer context 224 based on the parameters of the mapped EPS bearer contexts 215-216, or the associations between QoS flows and to be mapped EPS bearers if available (the associations are result of an inter-system change from S1 mode to N1 mode). The EBI=1 assigned for the default QoS flow 211 (with the default QoS rule 201) becomes the EBI=1 of the default EPS bearer 221. Or, in other words, the default QoS flow 211 is mapped to the default EPS bearer 221. The EBIs (EBI=1, and EBI=2), the QoS parameters, and the TFTs in the mapped EPS bearer contexts 215-216 are used for creating the EPS bearers 221-222, respectively.

In an example, when there is no EBI assigned to the default QoS flow 211, the UE 102 may perform a local release of the PDU session 210. When there is no EBI assigned to the non-default QoS flows 212-213, the UE 102 can locally delete the QoS rules and QoS flow descriptions of the respective non-default QoS flows.

In addition, at the end of the first session switch process 231, the UE 101 can associate an identity of the PDU session 210 with the default EPS bearer context 223, and associate the QoS rules and QoS flow descriptions of the QoS flows 211-213 with the respective EPS bearer contexts 223-224.

Upon inter-system change of the UE 101 from S1 mode to N1 mode takes place, the second session switch process 232 can be performed to switch the PDN connection 220 in the EPS 151 to the PDU session 210 in the 5GS 152. The UE 101 can use the parameters in the EPS bearer contexts 223-224 or QoS rule(s)/QoS flow description(s) associated with the EPS bearer contexts 223-224 to create the PDU session 210. For example, a PDU session identity associated with the default EPS bearer context 223 can be used as that of the PDU session 210. The QoS rules and QoS flow descriptions corresponding to the QoS flows 211-213 associated with the EPS bearer contexts 223-224 can be used to create QoS rules and QoS flow contexts of respective QoS flows 211-213 in the PDU session 210. In addition, at the end of the second session switch process 232, the UE 102 can associate the EBIs, the QoS parameters, and the TFTs of the EPS bearers 221-222 with the respective QoS flows 221-223 in the PDU session 210. The associations are stored at the UE 102.

While the UE 102 operates in N1 mode, 5GS session management (5GSM) processes (or procedures) can be performed over a non-access stratum (NAS) signaling connection between the UE 102 and the SMF 123 via the AMF 121 for PDU session handling in the UE 102 and in the SMF 123. For example, a 5GS mobility management (5GMM) protocol can operate between the UE 102 and the AMF 121, and be used as a transport protocol. A 5GSM message of a 5GSM protocol can be piggybacked in a 5GMM transport message. For example, the 5GSM message can be transmitted in an information element (IE) in the 5GMM transport message.

The 5GSM processes can include a UE-requested PDU session establishment process for establishing a PDU session, a network-initiated PDU session modification process (may be requested by a UE), and a network-initiated PDU session release process (may be requested by a UE).

Figure 3:
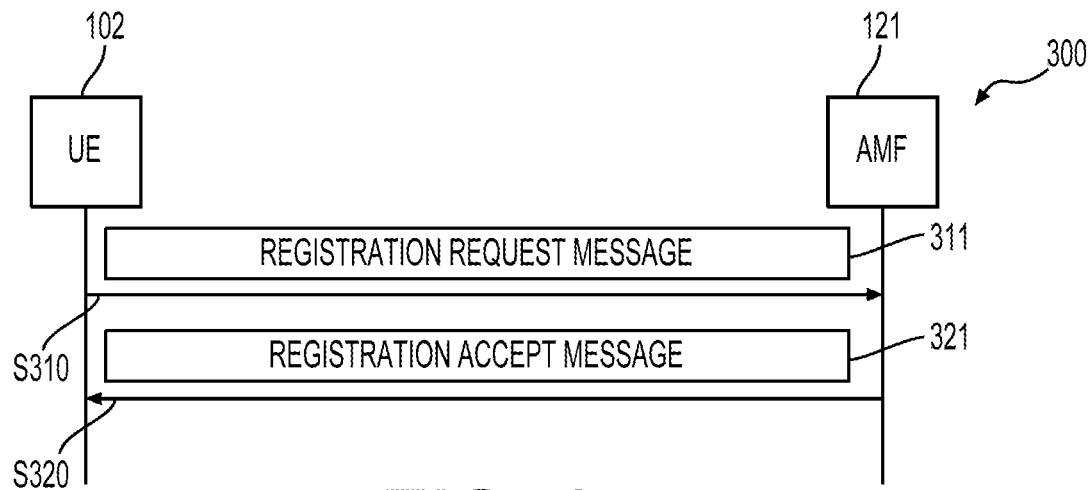
FIG. 3 shows a registration process (or procedure) 300 according to an embodiment of the disclosure.

FIG. 3 shows a registration process (or procedure) 300 according to an embodiment of the disclosure. The process can include steps S310-S320, and be performed between the UE 102 and the AMF 121 to register the UE 102 with the 5GS 152. Generally, the UE 102 can perform the registration process 300 to acquire authorization to receive services, to enable mobility tracking and to enable reachability. The registration process 300 can be one of the following registration types: initial registration to the 5GS 152; mobility registration update upon change to a new tracking arear (TA) outside a prior registered TA in connected or idle mode; periodic registration update; or emergency registration.

At S310, a registration request message 311 can be transmitted from the UE 102 to the AMF 121. The registration request message 311 can include cleartext IEs, such as registration type, subscription concealed identifier (SUCI) or 5G globally unique temporary identifier (GUTI) or permanent equipment identified (PEI), security parameters, additional GUTI, 4G tracking area update, or an indication that the UE 102 is moving from the EPS 151. Particularly, when the UE 102 has previously deactivated one or more EPS bearer contexts while operation in S1 mode without notifying the network, an EPS bearer context status IE can be included in the registration request message 311 to inform the network which EPS bearer contexts are active before an intersystem change from the S1 mode. In an example, in the case of mobility registration update, the UE 102 can include PDU sessions for which there are pending uplink data in a list of PDU sessions to be activated.

At S320, a registration accept message 321 can be transmitted from the AMF 121 to the UE 102 to indicate that the registration request has been accepted. In an example, the AMF 121 can indicate established PDU session to the UE 102 in a PDU session status IE. In response, the UE can remove locally internal resources related to PDU sessions that are not marked as established in the received PDU session status IE.

Figure 4:
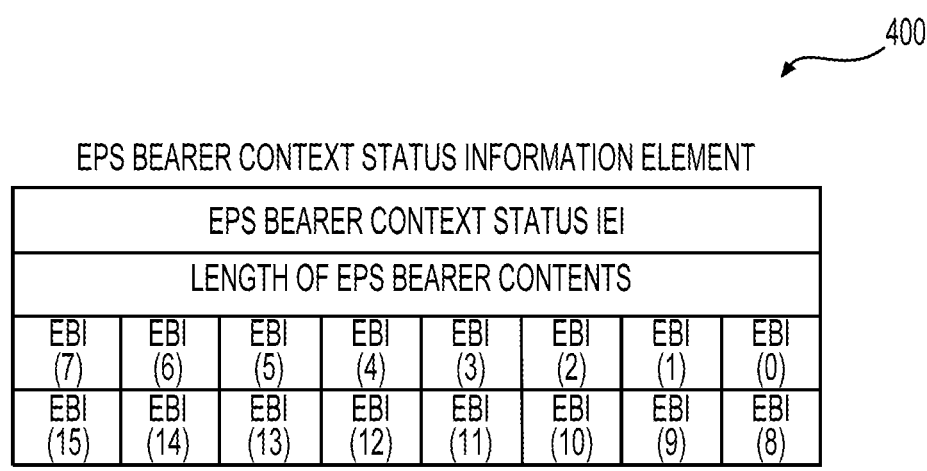
FIG. 4 shows an example of an EPS bearer context status information element (IE) 400.

FIG. 4 shows an example of an EPS bearer context status IE 400. When the UE 101 (or 102) operating in the single-registration mode performs an inter-system change from S1 mode to N1 mode, and the UE 101 has locally deactivated EPS bearer context(s) for which interworking to the 5GS 152 is supported while the UE was in S1 mode without notifying the network, the UE 102 can include the EPS bearer context status IE 400 in a registration request message to indicate the state of each EPS bearer context identified by an EBI.

As shown, the IE 400 can include an EPS bearer context status IE identifier (TED, a length of EPS bearer context status contents, and a set of EBI bits from EBI(1) to EBI(15) each corresponding to an EBI of an EPS bearer context at the UE 102. For example, an EBI bit of value 0 indicates that an EPS session management (ESM) state of the corresponding EPS bearer context is "bearer context-inactive", which is an equivalent of the corresponding EPS bearer context being inactive, while EBI bit of value 1 can indicate an ESM state of the corresponding EPS bearer context is not "bearer context-inactive", which is an equivalent of the corresponding EPS bearer context being active.

Figure 5:
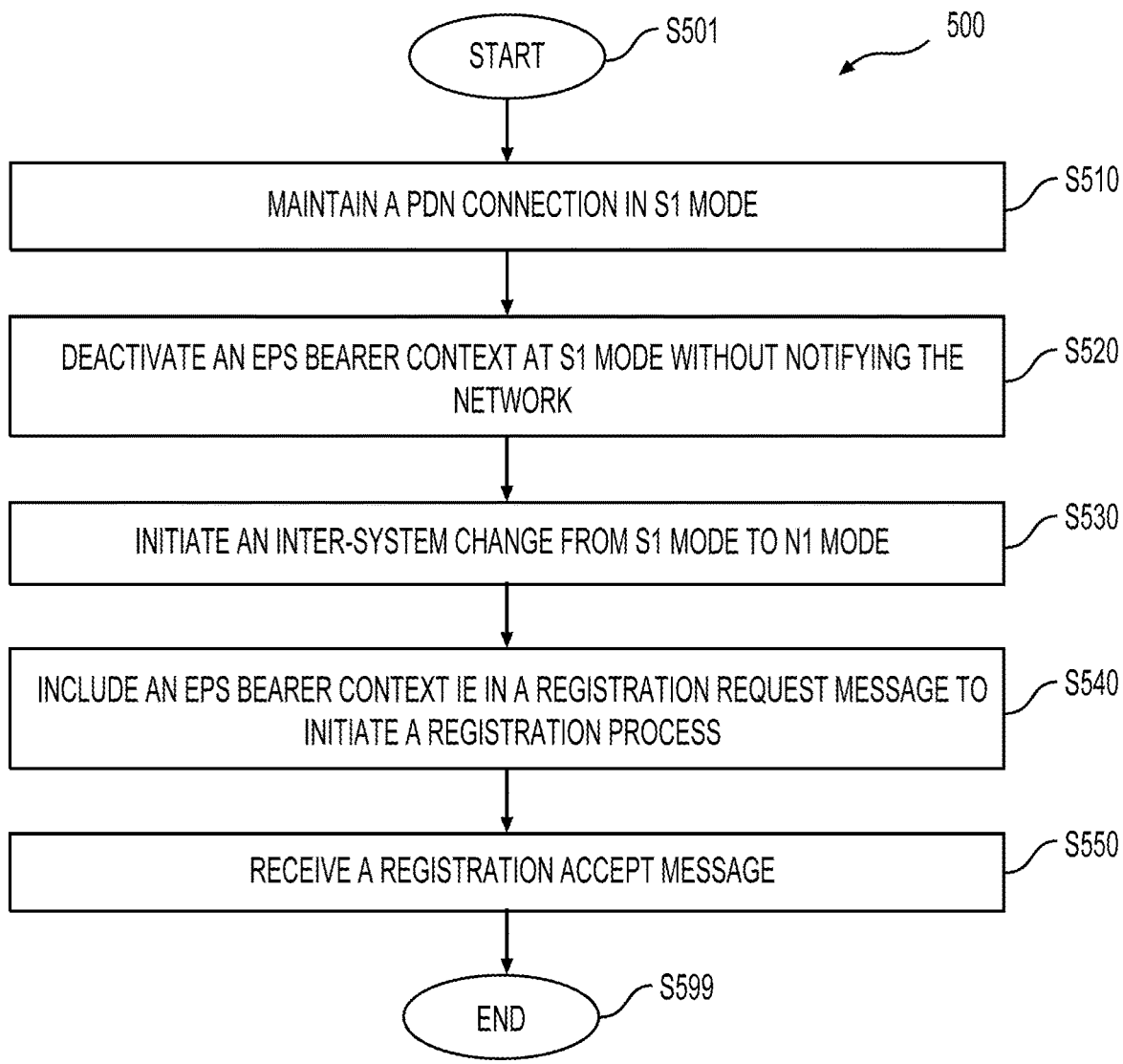
FIG. 5 shows an EPS bearer context status updating process 500 according to an embodiment of the disclosure.

FIG. 5 shows an EPS bearer context status updating process 500 according to an embodiment of the disclosure. The UE 101 (or 102) and the system 100 are used to explain the process 500. The UE 101 can perform the process 500 to synchronize EPS bearer context status between the UE 102 and the 5GC 120 upon an inter-system change from the EPS 151 to the 5GS 152. The process 500 can start from S501 and proceed to S510.

At S510, a PDN connection can be maintained at the UE 101 while the UE 101 being served by the EPC 110. The UE 101 can operate in S1 mode, and single registration mode. The PDN connection can be established in the EPS 151 or can be transferred from a PDU session as a result of an inter-system change from the 5GS 152. Or, the PDN connection can include EPS bearer contexts either established in the EPS 151 or transferred from a PDU session as a result of an inter-system change from the 5GS 152. In some examples, more than one PDN connections can be established and maintained between the UE 101 and the EPC 110.

At S520, an EPS bearer context can be deactivated by the UE 101 operating at S1 mode without notifying the network. The deactivated EPS bearer context can be a default or dedicated EPS bearer, and can be supported for interworking to the 5GS 152. For example, the deactivated EPS bearer (1) can have 5G QoS parameters (e.g., QoS rules, QoS flow descriptions, and the like) allocated by the EPC 110, or (2) can have an association with 5G QoS parameters or have an association with QoS flows defined by the corresponding 5G QoS parameters (the association between the deactivated EPS bearer and the 5G QoS parameters is stored at the UE 101 when a PDU session in the 5GS 152 is transferred to the PDN connection at S510 as a result of an inter-system change from the 5GS 152 to the EPS 151). In scenario (1), the EPS 151 indicates that interworking to the 5GS 152 is supported for the deactivated EPS bearer context, while in scenario (2), the stored association (not the EPS 151) indicates the interworking to the 5GS 152 is supported for the deactivated EPS bearer context.

More than one EPS bearer contexts for which interworking to the 5GS 152 is supported in one or more PDU sessions can be deactivated at the UE 101 without notifying the network (e.g., the EPC 110).

At S530, an inter-system change from S1 mode to N1 mode can be initiated. For example, the inter-system change can be triggered by radio signal condition at the UE 101 while the UE 101 is moving towards the gNB 132 in the FIG. 1 example, or other possible reasons (e.g., load balancing). The UE 101 if in connected mode can perform a handover process and switch from the EPS 151 to the 5GS 152. The UE 101 if in idle mode can perform a cell reselection process. Until the inter-system change, the UE 101 does not have a chance to update the network about the locally deactivated EPS bearer context(s) for which interworking the 5GS 152 is supported. Thus, the EPS bearer context status are not synchronized between the UE 101 and the network (e.g., the EPC 110 or the 5GC 120).

At S540, upon the inter-system change, the UE 101 can include an EPS bearer context status IE in a registration request message to initiate a registration process (e.g., mobility registration update). For example, the registration process can be performed after the handover process or the cell reselection process. The EPS bearer context status IE can indicate to the network which EPS bearer contexts are active or inactive at the UE 101 before the inter-system change.

In an example, at the 5GC 120, the AMF 121 receives the EPS bearer context status IE in the registration request message from UE 101. The AMF 121 can send the EPS bearer context status to corresponding PGW-C+SMFs, such as the SMF 123. For example, the SMF 123 can check whether the EPS bearer(s) has been deactivated (deleted) by the UE 102 but not notified to network. If yes, the SMF 123 can release those EPS bearer(s), the corresponding 5G QoS rule(s) and QoS flow level QoS parameters (QoS flow description(s)) locally.

At S550, a registration accept message can be received at the UE 102 from the AMF 121. For example, the registration accept message can include an EPS bearer context status IE to indicate the UE 102 which mapped EPS bearer contexts are active in the network (e.g., at the SMF 123 in the 5GC 120). The process 500 can proceed to S599 and terminate at S599.

Figure 6:
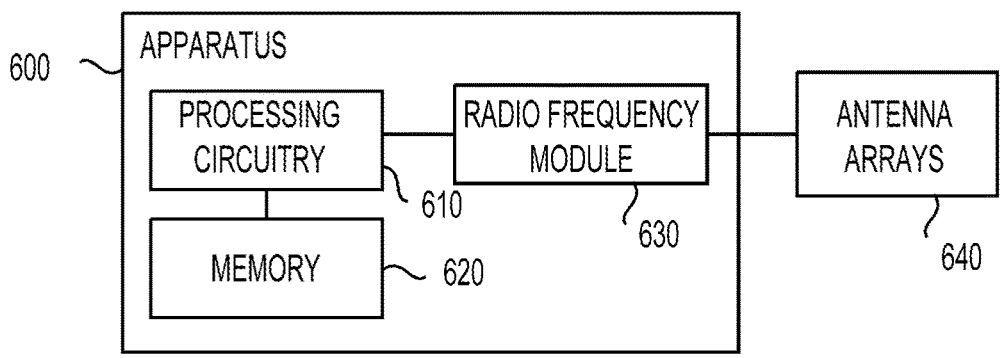
FIG. 6 shows an exemplary apparatus 600 according to embodiments of the disclosure.

FIG. 6 shows an exemplary apparatus 600 according to embodiments of the disclosure. The apparatus 600 can be configured to perform various functions in accordance with one or more embodiments or examples described herein. Thus, the apparatus 600 can provide means for implementation of mechanisms, techniques, processes, functions, components, systems described herein. For example, the apparatus 600 can be used to implement functions of UEs, base stations, and elements of core networks in various embodiments and examples described herein. The apparatus 600 can include a general purpose processor or specially designed circuits to implement various functions, components, or processes described herein in various embodiments. The apparatus 600 can include processing circuitry 610, a memory 620, and optionally a radio frequency (RF) module 630.

In various examples, the processing circuitry 610 can include circuitry configured to perform the functions and processes described herein in combination with software or without software. In various examples, the processing circuitry 610 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 610 can be a central processing unit (CPU) configured to execute program instructions to perform various functions and processes described herein. Accordingly, the memory 620 can be configured to store program instructions. The processing circuitry 610, when executing the program instructions, can perform the functions and processes. The memory 620 can further store other programs or data, such as operating systems, application programs, and the like. The memory 620 can include non-transitory storage media, such as a read only memory (ROM), a random access memory (RAM), a flash memory, a solid state memory, a hard disk drive, an optical disk drive, and the like.

In an embodiment, the RF module 630 receives a processed data signal from the processing circuitry 610 and converts the data signal to beamforming wireless signals that are then transmitted via antenna arrays 640, or vice versa. The RF module 630 can include a digital to analog converter (DAC), an analog to digital converter (ADC), a frequency up converter, a frequency down converter, filters and amplifiers for reception and transmission operations. The RF module 630 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 640 can include one or more antenna arrays.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
locally deactivating an evolved packet system (EPS) bearer context of a packet data network (PDN) connection at a user equipment (UE) while the UE operates in an S1 mode without notifying a network serving the UE;
determining interworking to a fifth generation system (5GS) in the network is supported for the deactivated EPS bearer context when the deactivated EPS bearer context includes fifth-generation (5G) quality of service (QoS) parameters received from an evolved packet core (EPC) in the network or has an association with 5G QoS parameters resulting from an inter-system change from an N1 mode to the S1 mode; and
based on the interworking to the 5GS being determined to be supported for the deactivated EPS bearer context, upon an inter-system change from the S1 mode to the N1 mode, including an EPS bearer context status information element (IE) in a registration request message indicating which EPS bearer contexts are active in the UE.

2. The method of claim 1, wherein an EPS serving the UE operating in the S1 mode indicates that the interworking to the 5GS is supported for the deactivated EPS bearer context.

3. The method of claim 1, wherein the deactivated EPS bearer context has an association between the EPS bearer context and a QoS flow stored during the inter-system change from the N1 mode to the S1 mode.

4. The method of claim 1, wherein the UE operates in a single-registration mode.

5. The method of claim 1, further comprising:
transmitting the registration request message to a fifth generation core (5GC) serving the UE after the inter-system change from the S1 mode to the N1 mode.

6. A user equipment (UE), comprising circuitry configured to:
locally deactivate an evolved packet system (EPS) bearer context of a packet data network (PDN) connection while the UE operates in an S1 mode without notifying a network serving the UE;
determine interworking to a fifth generation system (5GS) in the network is supported for the deactivated EPS bearer context when the deactivated EPS bearer context includes fifth-generation (5G) quality of service (QoS) parameters received from an evolved packet core (EPC) in the network or has an association with 5G QoS parameters resulting from an inter-system change from an N1 mode to the S1 mode; and
based on the interworking to the 5GS being determined to be supported for the deactivated EPS bearer context, upon an inter-system change of the UE from the S1 mode to the N1 mode, include an EPS bearer context status information element (IE) in a registration request message indicating which EPS bearer contexts are active in the UE.

7. The UE of claim 6, wherein an EPS serving the UE operating in the S1 mode indicates that the interworking to the 5GS is supported for the deactivated EPS bearer context.

8. The UE of claim 6, wherein the deactivated EPS bearer context has an association between the EPS bearer context and QoS flow stored during the inter-system change from the N1 mode to the S1 mode.

9. The UE of claim 6, wherein the UE operates in a single-registration mode.

10. The UE of claim 6, wherein the circuitry is configured to:
transmit the registration request message to a fifth generation core (5GC) serving the UE after the inter-system change from the S1 mode to the N1 mode.

11. A non-transitory computer-readable medium storing instructions that, when executed by a processor, cause the processor to perform a method, the method comprising:
locally deactivating an evolved packet system (EPS) bearer context of a packet data network (PDN) connection at a user equipment (UE) while the UE operates in an S1 mode without notifying a network serving the UE;
determining interworking to a fifth generation system (5GS) in the network is supported for the deactivated EPS bearer context when the deactivated EPS bearer context includes fifth-generation (5G) quality of service (QoS) parameters received from an evolved packet core (EPC) in the network or has an association with 5G QoS parameters resulting from an inter-system change from an N1 mode to the S1 mode; and
based on the interworking to the 5GS being determined to be supported for the deactivated EPS bearer context, upon an inter-system change from the S1 mode to the N1 mode, including an EPS bearer context status information element (IE) in a registration request message indicating which EPS bearer contexts are active in the UE.

12. The non-transitory computer-readable medium of claim 11, wherein an EPS serving the UE operating in the S1 mode indicates that the interworking to the 5GS is supported for the deactivated EPS bearer context.

13. The non-transitory computer-readable medium of claim 11, wherein the deactivated EPS bearer context has an association between the EPS bearer context and QoS flow stored during the inter-system change from the N1 mode to the S1 mode.

14. The non-transitory computer-readable medium of claim 11, wherein the UE operates in a single-registration mode.

* * * * *